(12) United States Patent
O'Neal

(10) Patent No.: US 9,433,198 B2
(45) Date of Patent: Sep. 6, 2016

(54) FISHING LINE KNOTTER

(71) Applicant: Phyllis D. O'Neal, Lawrenceburg, KY (US)

(72) Inventor: Ronald L. O'Neal, Lawrenceburg, KY (US)

( * ) Notice: Subject to any disclaimer, the term of this patent is extended or adjusted under 35 U.S.C. 154(b) by 0 days.

(21) Appl. No.: 14/544,921

(22) Filed: Mar. 6, 2015

(65) Prior Publication Data
US 2015/0327528 A1  Nov. 19, 2015

Related U.S. Application Data

(60) Provisional application No. 61/966,935, filed on Mar. 6, 2014.

(51) Int. Cl.
*A01K 91/04* (2006.01)
*A01K 97/00* (2006.01)
*D03J 3/00* (2006.01)

(52) U.S. Cl.
CPC ............... *A01K 91/04* (2013.01); *A01K 97/00* (2013.01); *D03J 3/00* (2013.01)

(58) Field of Classification Search
CPC ........ A01K 91/04; A01K 97/00; D04G 3/02; D03J 3/00; B65B 13/265
USPC ......................................... 289/1.2, 1.5, 2, 17
See application file for complete search history.

(56) References Cited

U.S. PATENT DOCUMENTS

| | | | |
|---|---|---|---|
| 1,621,868 A * | 3/1927 | Boedker | B65H 69/04 289/17 |
| 2,610,631 A * | 9/1952 | Calicchio | A61B 17/12013 289/17 |
| 2,689,147 A | 9/1954 | Smalley | |
| 2,859,994 A * | 11/1958 | Whitlinger | A01K 97/26 289/17 |
| 2,926,036 A | 2/1960 | Wimberley | |
| 2,934,369 A * | 4/1960 | Kennedy | A01K 91/04 289/17 |
| 3,086,802 A * | 4/1963 | Keeton | A01K 91/04 289/17 |
| 3,101,964 A * | 8/1963 | Marshall | A01K 91/04 269/124 |
| 3,131,957 A | 5/1964 | Musto | |
| 3,265,422 A | 8/1966 | Bryan | |
| 3,357,086 A * | 12/1967 | Hood | A01K 91/04 223/99 |
| 3,402,957 A | 9/1968 | Peterson | |
| 3,625,556 A * | 12/1971 | Stromberg | A01K 91/04 289/17 |
| 3,857,592 A * | 12/1974 | Koike | D04G 3/02 139/1 R |
| 4,029,346 A | 6/1977 | Browning | |
| 4,401,328 A * | 8/1983 | Yamada | A01K 91/04 289/17 |
| 4,558,894 A * | 12/1985 | Detterbeck | H01B 13/01272 140/93 R |
| 4,660,314 A | 4/1987 | Janssen | |
| 4,714,281 A | 12/1987 | Peck | |
| 5,211,650 A * | 5/1993 | Noda | A61B 17/0469 289/1.2 |
| 5,236,232 A | 8/1993 | Broberg | |
| 5,312,423 A * | 5/1994 | Rosenbluth | A61B 17/12013 606/139 |
| 5,405,354 A * | 4/1995 | Sarrett | A61B 17/0469 112/169 |

(Continued)

*Primary Examiner* — Clinton T Ostrup
*Assistant Examiner* — Bao-Thieu L Nguyen
(74) *Attorney, Agent, or Firm* — Carrithers Law Office, PLLC

(57) ABSTRACT

A tool for making the task of tying a hook or bait onto a fishing line using one hand. The device includes a magnet to hold the hook or bait, holders for an end of the line on either side of the hook, a cutter for cutting the line, a housing neck around which to wrap the line and a sliding line puller which pulls the line back through the wraps.

4 Claims, 6 Drawing Sheets

(56) References Cited

U.S. PATENT DOCUMENTS

| | | | | |
|---|---|---|---|---|
| 5,439,470 A * | 8/1995 | Li | A61B 17/0469 | 289/17 |
| 5,562,683 A * | 10/1996 | Chan | A61B 17/0469 | 289/17 |
| 5,662,666 A * | 9/1997 | Onuki | A61B 17/0483 | 112/169 |
| 5,685,037 A | 11/1997 | Fitzner | | |
| 5,791,699 A * | 8/1998 | High | D03J 3/00 | 289/17 |
| 5,816,140 A * | 10/1998 | Hart | B65B 27/12 | 100/25 |
| 5,829,798 A | 11/1998 | Little | | |
| 5,846,254 A * | 12/1998 | Schulze | A61B 17/0469 | 289/1.2 |
| 5,951,067 A | 9/1999 | High | | |
| 6,227,580 B1 * | 5/2001 | Sundby | A63H 27/10 | 289/17 |
| 6,322,112 B1 * | 11/2001 | Duncan | A01K 91/04 | 289/1.2 |
| 6,715,804 B2 | 4/2004 | Beers | | |
| 6,746,457 B2 * | 6/2004 | Dana | A61B 17/0057 | 606/148 |
| 7,094,246 B2 * | 8/2006 | Anderson | A61B 17/0485 | 606/139 |
| 7,309,086 B2 | 12/2007 | Carriter | | |
| 7,334,822 B1 | 2/2008 | Hines, Jr. | | |
| 7,510,220 B1 | 3/2009 | Wood | | |
| 7,666,196 B1 * | 2/2010 | Miles | A61B 17/04 | 289/2 |
| 8,146,286 B2 | 4/2012 | Wood | | |
| 8,211,123 B2 * | 7/2012 | Gross | A61B 17/0467 | 606/138 |
| 8,585,720 B2 * | 11/2013 | Gross | A61B 17/0467 | 606/138 |
| 8,911,457 B2 * | 12/2014 | Koogle, Jr. | A61B 17/0467 | 606/148 |
| 2003/0181926 A1 * | 9/2003 | Dana | A61B 17/0485 | 606/148 |
| 2004/0004355 A1 | 1/2004 | Beers | | |
| 2004/0130155 A1 | 7/2004 | Champion | | |
| 2007/0182157 A1 | 8/2007 | Carrier | | |
| 2010/0156100 A1 | 6/2010 | Goldsmith | | |
| 2013/0048665 A1 * | 2/2013 | Alguire | A01K 95/02 | 221/268 |
| 2015/0048616 A1 * | 2/2015 | Mashhour | A01K 91/04 | 289/1.5 |
| 2015/0143736 A1 * | 5/2015 | Zdroik | A01K 97/01 | 43/17 |
| 2015/0327529 A1 * | 11/2015 | Zimmerman | A01K 97/06 | 43/25.2 |

* cited by examiner

FISHING LINE KNOTTER

CROSS REFERENCES TO RELATED APPLICATIONS

This application claims priority from U.S. Provisional Application Ser. No. 61/966,935 filed on Mar. 6, 2014 and is incorporated by reference herein.

TECHNICAL FIELD

The present invention relates to the field of devices which aid in the tying of a hook, a leader or an artificial bait onto a fishing line.

BACKGROUND OF THE INVENTION

Tying fine lines to fish hooks is difficult even for an individual with good vision and manual dexterity . . . but for someone who is older, handicapped or not as coordinated as others, the task is frustrating and even dangerous. Whether using monofilament or stranded line, knot tying is difficult even under good conditions. With wet and/or cold hands, the problem is greatly magnified. Because fishing is a popular sport, much interest has been directed towards finding ways of simplifying the attachment of lines to fish hooks.

In all types of fishing, especially fly fishing, to be successful, it is important to be able to relatively easily and quickly change to different flies, hooks or other baits, depending on the water conditions and upon what insect or on which other bait the fish are feeding. During a normal day of fishing, an angler may change flies, hooks, or similar article many times. Because of these numerous changes, it is preferable to be able to tie a secure knot in a timely and efficient manner. Each time the fly, hook or other bait is changed, the line is shortened. To decrease tying time and minimize this loss of line or leader, a convenient and easy to use tool is needed.

DESCRIPTION OF THE RELATED ART

U.S. Pat. No. 6,715,804 by Beers for FISHERMAN'S KNOT TIER which issued on Apr. 6, 2004 teaches a hand tool with an alligator clip which holds the hook while the user ties the knot. With the line threaded in the eyelet, the user twists the line several turns. The tool includes a central shaft which is spring loaded and is held inside a housing by the spring. The user pushes a distal end of the shaft forward so that the distal end of the shaft extends past the housing. The distal end of the shaft contains a notch which holds the end of the fishing line when the line is pulled into the notch. The shaft is then released and the spring pulls the end of the line against the housing to hold the line tightly. Now, while the user holds that portion of the line connected to the real, the tool is pulled to pull the free end of the line through the twists made in the line, until the line is tied tightly around itself.

U.S. Pat. No. 2,926,036 by Wimberley for FISHERMAN'S KNOT TYING TOOL which issued on Feb. 23, 1960 teaches a shaft like tool with a spring fork at the distal end to hold the hook. The user holds the tool with the portion of the line which is connected to the reel against the handle. Now the user wraps the free end of the line around the handle and the portion of line against the handle a selected number of turns. The free end of the line is now held in a notched out portion of the handle which is located distally of the turns of line. Now the turns of line are pulled over and past the notch. The hook is then pulled distally to tighten the turns of line and thus the knot is formed and tightened.

SUMMARY OF THE INVENTION

In accordance with the present invention, there is provided a device comprising, consisting of, or consisting essentially of a longitudinal housing including a proximal handle, a distal forked end, a first neck with a first selected diameter located distally of the handle, a second neck with a smaller second selected diameter, a third neck with a still smaller selected diameter, and a sliding line puller which slides longitudinally within a first slot in the first neck and the second neck. The first neck has a diameter of about five-eights of an inch, the second neck has a diameter of about one half of an inch, and the third neck has an oval in cross-section and having a minor width of about one quarter of an inch. The forked end comprises four tines grouped in two rows of two tines each, the forked ends opening toward a distal end of the knot too. The forked ends having a magnet at a center of the junction of the four tines. The knot tool has a second longitudinal slot formed in a top surface thereof beginning at a distal end of the proximal handle. The second slot has a thumb button cooperatively and slidably engaged within. The thumb button has a downward extending shaft cooperatively engaging the sliding line puller. The sliding line puller is horizontally longitudinal and has a hook located at a proximal end thereof. The hook has a free end extending upwardly and proximal and is sized for hooking and pulling a fishing line therewith. The hook has a vertical height just less than a vertical depth of the first slot. The sliding line puller has at least two lateral parallel horizontally spaced apart lugs. The spaced apart lugs have a horizontal channel formed there between. The knot tool has a guide rail formed within. The guide rail has a horizontal planar portion which declines at a proximal end thereof. The horizontal channel cooperatively engages an edge of the guide rail. The horizontal channel on the sliding line puller sliding along the guide rail causes the hook to slide within the first slot. The hook extends distally outside of the second neck when the thumb button is pushed to a distal end of the second slot. The hook raises out of the first slot at a proximal end of the first slot when the thumb button is pulled to a proximal end of the second slot, due to the channel following the decline of the guide rail. The knot tying tool has two spaced apart pins extending laterally from each side thereof. A first of the two pins are formed of or covered with a plastic, rubber, or other resilient material such as an elastomeric tube. A second of the two pins has an oblong lug rotatably and eccentrically connected to the second of the two pins. The two pins are spaced apart so that the oblong lug is held in interference with the first pin when the oblong lug is rotated against the first pin. The proximal handle of the knot tool may include a cavity formed therein and a closable cap removably attached at an opening of the cavity. Furthermore, the knot tool may include a fishing line cutter comprising a flat metallic element with an integral tab extending outward at an angle therefrom. A square aperture may also be formed in the bottom surface having a depth of about one inch for the purpose of removably connecting the knot tying tool to a longitudinal member or a clamping means such as a clampable tool holder.

It is an object of this invention to provide a fisherman's knot tying tool by which a normal or a handicapped angler may repeatedly tie a knot in the eyelet of a fishing hook, lure or leader, unassisted, whether the handicap is a debilitating disease such as arthritis or when the angler has only one hand. A clamp assisted tool mounting post is suggested and included for a one handed angler.

Another object of the present invention is to provide a means by which an angler may repeatedly tie a knot around the eyelet of a fishing hook, lure or leader, unassisted for the handicapped by loss of one limb or even faster and more reliably where used by both hands in situations of cold, arthritic medical encounters or unfamiliar encounters for the novice and even in most cases, the experienced fisherman.

Another object of the present invention is to provide a light weight, floatable, decorative, long lasting and easily operated where there are no moving parts to be operated.

Another object of the present invention for the device to be reversible, offering easy operation by both right and left handed anglers. A very short practice session will enable the user to become highly proficient at producing dependable and visually pleasing knots.

Another object of the present invention to provide a cutoff device for the excess line, following the knotting procedure, installed on the body of the product, to finalize the knotting process, except where the handicapped angler is concerned. For the handicapped angler, a clamp assisted mounting post, designed for attachment to a stable surface, is required.

It is an object of this invention to provide a fisherman's knot tying tool which eases the task of tying a hook or bait onto a fishing line.

It is an object of this invention to provide a fisherman's knot tying tool which is light weight, able to float, decorative, long lasting, easy to operate and equally usable by left or right handed people.

It is an object of this invention to provide a fisherman's knot tying tool which holds a selected end of the line tight to maintain control of the line.

It is an object of this invention to provide a fisherman's knot tying tool which has an element which positively pulls the line through coils or turns which have been made in the line.

It is an object of this invention to provide a fisherman's knot tying tool which provides a quick and easy temporary attachment of the hook or bait to the tool through the use of a powerful magnet.

It is an object of this invention to provide a fisherman's knot tying tool which provides a non-slip, large, easy to hold handle.

It is an object of this invention to provide a fisherman's knot tying tool which includes an easy to use line cutting tool.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with the present invention, there is provided a fisherman's knot tying tool 10, as shown in FIGS. 1-9. The tool is also referred to as the fishing line knotter tool 10. The tool is designed so that an individual having only one arm or one free hand can clamp the knotter 10 to a structure and proceed to tie a knot securing a hook with only one hand.

Figure 1:
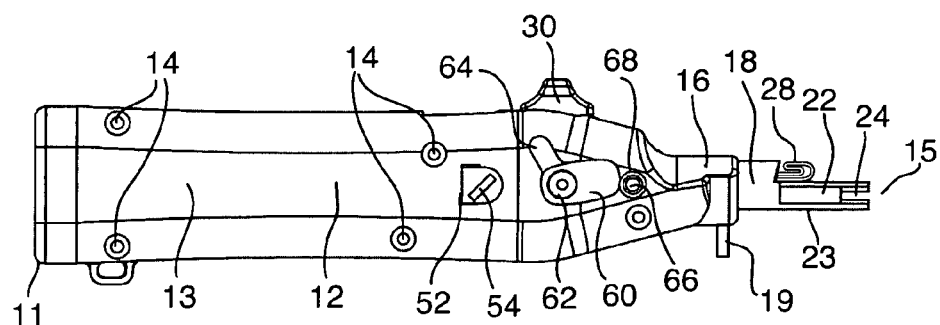
FIG. 1 is a right side view of the fishing line knotter.
Figure 2:
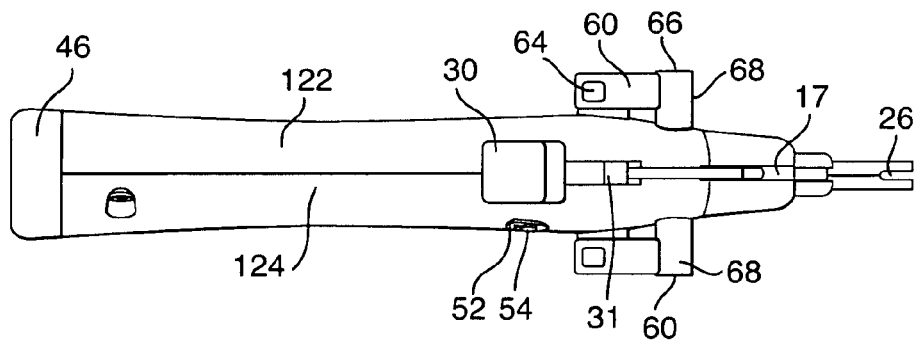
FIG. 2 is a top view of the fishing line knotter.
Figure 3:
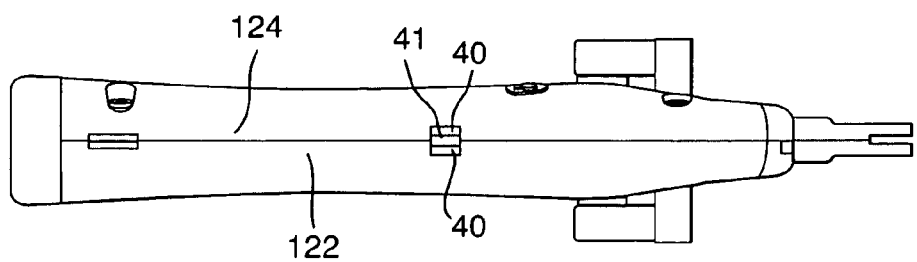
FIG. 3 is a bottom view of the fishing line knotter.

As shown in FIG. 1, the knot tool 10 includes a longitudinal housing 12 having a left half 122 and a right half 124 which are held together by fastening means such as fasteners 14 including glue, screws, rivets, snaps or barbs. The housing 12 is preferably about nine or ten inches long with the proximal end 11 at the left and the distal end 15 at the right as shown in FIG. 1. A hook or bait holding means including a forked neck 23 with a strong magnet 22 at the center of the fork is located at the distal end of the tool 10. The proximal portion of the tool 10 forms a handle 13 which is to be grasped by a hand of the user, with the distal end of the tool 10 pointing away from the user. The handle portion 13 preferably has a roughly rectangular cross section with rounded corners but may be oval or circular. Located at the top of knot tool 10 at the center of the length of the tool is a sliding thumb button 30 which slides in a lengthwise slot 31. The thumb button 30 slides back and forth proximally and distally with pressure from a users thumb. The thumb button 30 in turn moves a sliding line puller 27 to pull the free end of the fishing line through loops of line, as will be seen later.

Starting at about three quarters of the way from the proximal end of the knot tool 10, the housing 12 tapers forming a projection defining a first neck 16 which has a roughly circular cross section of about five eighths of an inch in diameter and is about an inch long. At the distal end of the first neck 16 the projection steps down forming a second neck 18 having a smaller diameter extends about one half inch in diameter and about one half inch in length from the distal end of the first neck 16. Thus the first level off of the post is a larger diameter neck while the second neck having a smaller diameter allows the line to slide straight out after snagging the post is turned right or left for wrapping. Extending downward at the bottom distal edge of the first neck 16 is a post 19 which provides a structure to hold the line behind while forming the knot. Finally, at the distal end of the second neck 18 is a third neck 23 which is oval in cross section, about one inch in length, and extends distally from the lower half of the second neck 18. The third neck 23 includes a horizontal slot 24 and a vertical slot 26 at the distal end which are parallel to the long axis of the knot tool 10 and are perpendicular to one another. The slots 24 and 26 extend radially through the entire thickness of the third neck 23. The slots 24 and 26 extend proximally from the distal end of tool 10 for about one quarter of an inch. A magnet 22 is located at the proximal end of the slots. Slot 24 is horizontal when the knot tool 10 is held with the thumb button 30 at the top.

Figure 9:
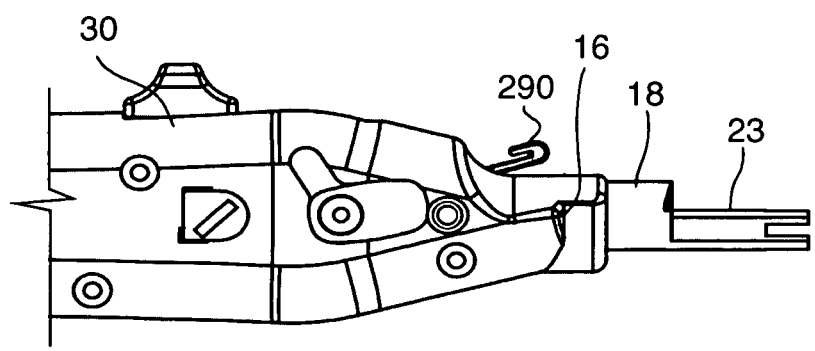
FIG. 9 is a partial view of the knot tool particularly showing the line hook of the fishing line knotter.

A line pulling means or a sliding line puller 27 includes a hook 28 as shown in FIGS. 1, 4-5, 9 and 11-21. The line puller 27 has an approximately two and one half inch long longitudinal shaft 292 with an upward extending hook 28 at the distal end which is used to pull the fishing line in a proximal direction through slot 17 and then to raise the line upward from the first neck 16. A lug 282 at the proximal end of the line-puller 27 contains a vertical through hole 294. About one inch from the proximal end of line-puller 27 there are four rectangular horizontal lugs extending laterally, two from each side of the shaft 292, two lugs 284 at the top edge of shaft 292 and two lugs 286 at the bottom edge. There is a horizontal slot 288 formed between the two lugs 284 and 286 on each side of the shaft 292. FIG. 9 shows the hook extending above the first neck 16.

Figure 4:
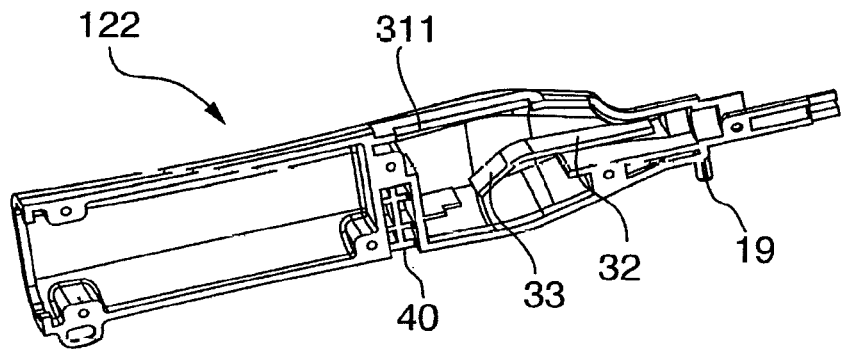
FIG. 4 is a right side view of the left half of the fishing line knotter.
Figure 5:
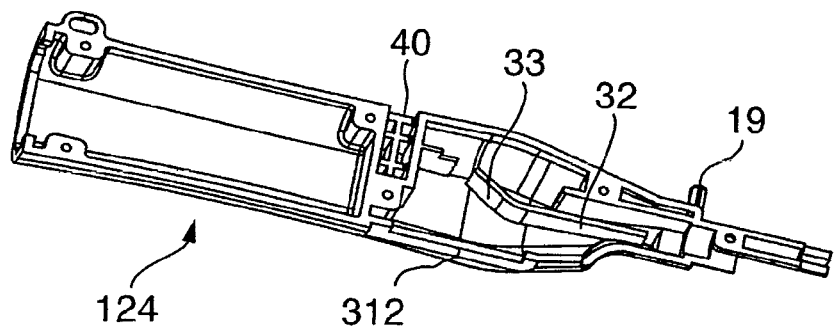
FIG. 5 is a split view showing the left and the right halves of the fishing line knotter.
Figure 6:
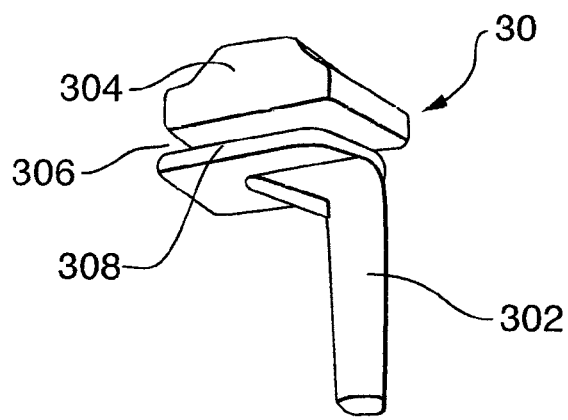
FIG. 6 is a right side view of the thumb button of the fishing line knotter.
Figure 7:
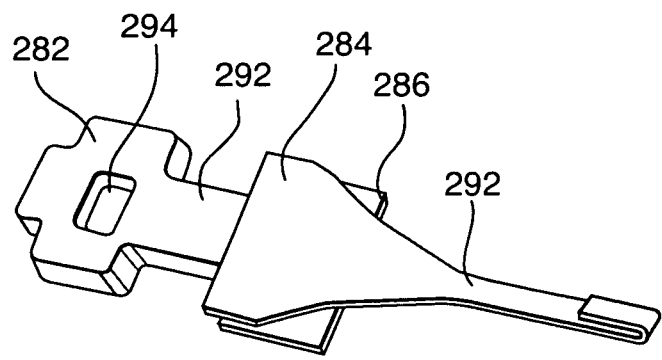
FIG. 7 is a top view of the sliding line puller of the fishing line knotter.
Figure 8:
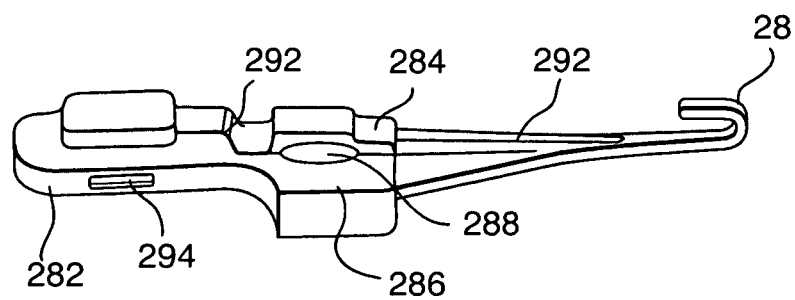
FIG. 8 is a side view of the sliding line puller of the fishing line knotter.

The sliding line-puller 27 slides horizontally inside the housing 12 and is guided by means of two horizontal slots 288 on either side of shaft 292 sliding forwards and back on two inward extending mostly horizontal guide rails 32 which extend inwardly from the outer walls of the left half housing 122 and right half housing 124 of housing 12. As shown in FIG. 4, the guide rails 32 are horizontal at the distal ends but near the proximal end, the guides 32 include a downward incline 33. As the slots 288 of sliding line-puller 27 slide along the downward incline 33, the distal end of the shaft 292 is tilted and raised upward so that the hook 28 is raised to lift the line above and away from first neck 16 of housing 12 during the knot tying process.

An alternate embodiment of the knot tool has a sliding line puller 27 with only one lug 284 and one lug 286 forming only one slot 288, rather than lugs and a slot on both sides of the sliding ling puller 27.

The thumb button 30 includes a downward extending shaft 302 which extends vertically downward through the vertical hole 294 in the proximal end of shaft 292. The housing 12 contains a slot 31 which runs longitudinally on the top of housing 12 from the center of the housing and distally for a distance of about one and one quarter inches. The bottom surface 304 of thumb button 30 and the top surface of a lug 308 form horizontal slots 306 on each side of thumb button 30. The sides 311 and 312 of the slot 31 form guide rails for the horizontal slots 306 in the thumb button 30. The slots 306 held by the guide rails 311 and 312 provide smooth horizontal forwards and rearwards movement of the thumb button 30. A slot 17, also in the top of housing 12, extends through the first neck 16 and the second neck 18, providing a path for the hook 28 to travel forwards and back as the thumb button 30 causes the line puller 27 to move forward and backward. When a user pushes the thumb button distally down the housing 12, the shaft 302 pushes the line-puller 27 distally as well. With the thumb button 30 at the distal end of the slot 31, the hook 28 extends out of the housing 12 past the second neck 18 and above the third neck 23. When the thumb button 30 is pulled proximally to the proximal end of the slot 31, the hook 28 moves rearward in slot 17 with the free end of the fishing line and then is lifted upwards as the slots 288 follow the profile of the inward extending walls 33, at which point, the hook 28 extends above the first neck 16.

Two one half inch long by three sixteenths inch diameter pins 66 extend laterally from the outer side of each housing 122 and 124 at the point where the housing starts to taper down to first neck 16 and at the center vertically on each housing 122 and 124. A first pin including an elastomeric sleeve, plastic or rubber coating or pin composed of a material having a resilient surface 68 with a thickness of about one sixteenth inch covers each pin 66. Two other one half inch long by one quarter inch diameter pins 62 extend laterally from housings 122 and 124 parallel to pins 66 and approximately five eighths of an inch center to center proximal to pins 66. An approximately ovoid lug 60 rotates eccentrically on a selected pin 62. The lugs 60 have a major radius of about one half inch. This causes an interference of the major radius with the first pin 68 when the major radius sweeps by the tube, and thus allows a user to capture the fishing line between the first pin and the lug to temporarily hold the line in place.

The approximately ovoid lug 60 preferably contains an outward extending lug 64 to be used as a handle or crank for rotating the lug 60 about the pin 62. Alternatively, the lug can be molded in the side of the tube to provide the same function as a groove which curves inward to be against the body providing a hook on either one or both sides of the tool. The lug may comprise a projection or other peg including a gap, groove, or other means to hold the line in position. The projection may include a compressible material such as a sleeve of rubber or elastomeric material to bias the line against the body or housing surface.

Located on the lateral outside of the right half housing 124 just below the thumb button 30 is a line cutter comprising a metal plate 52 with an integral tab 54 extending outward at a slight angle from the plate 52. The tab 52 may comprise a projection or other peg including a gap, groove, or other means to hold the line in position. The projection may include a compressible material such as a sleeve of rubber or elastomeric material to bias the line against the body or housing surface The handle 13 of the knot tool 10 is preferably hollow. The proximal end cap 46 is detachable from the end of the hollow handle 13. With the end cap 46 removed, selected fishing items such as baits, hooks, or floats may be stored within the hollow handle and retained therein by the end cap 46.

Figure 10:
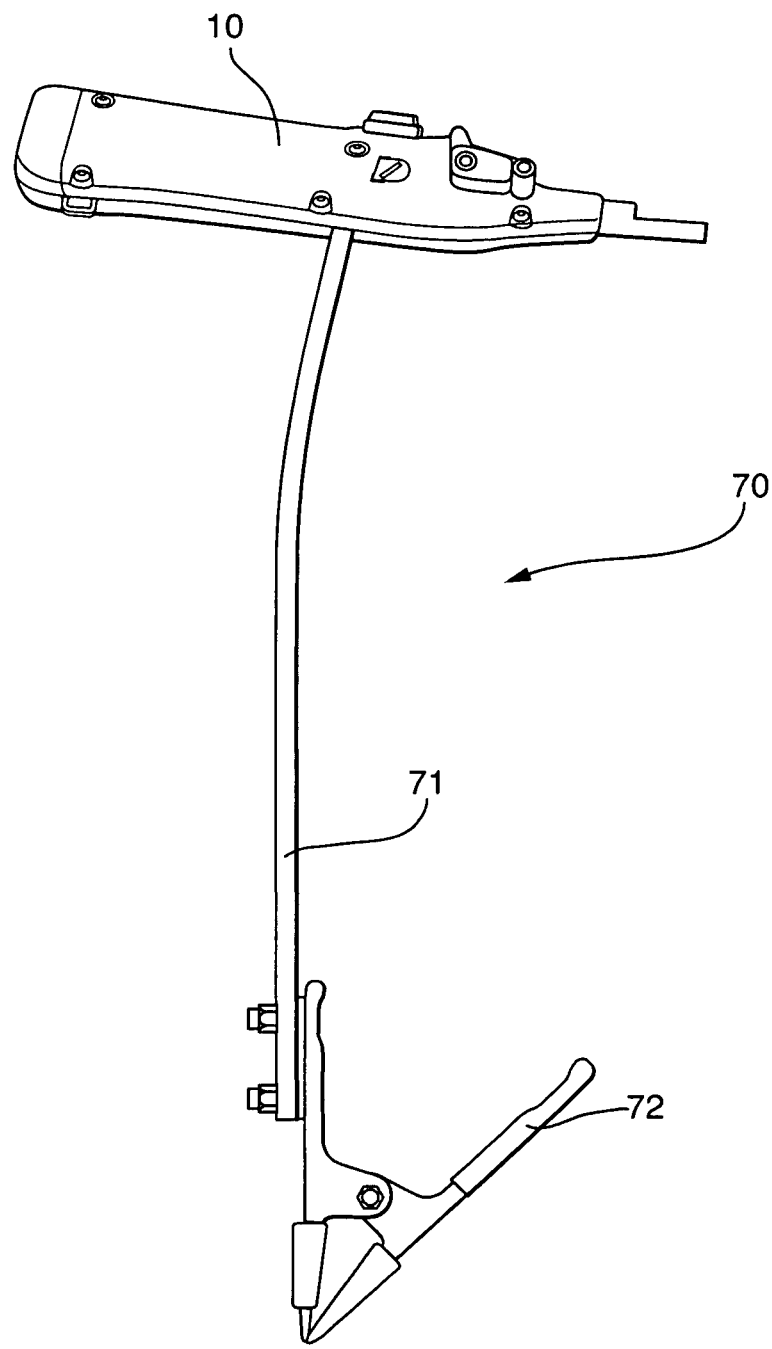
FIG. 10 is a front view of a clamp stand for hands free use of the fishing line knotter.
Figure 11:
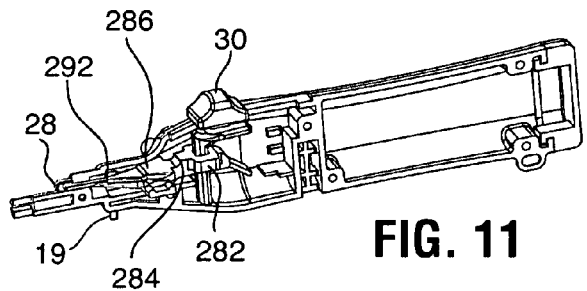
FIG. 11 is a perspective sectional view of the right half of the fishing line knotter showing the hook in the forward position.
Figure 12:
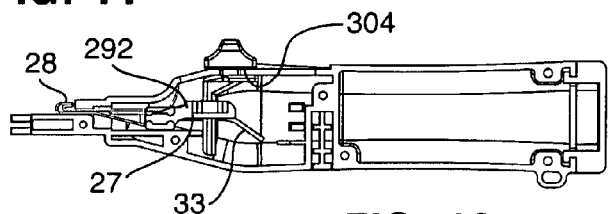
FIG. 12 is a side sectional view of the right half of the fishing line knotter showing the hook in the forward position.
Figure 13:
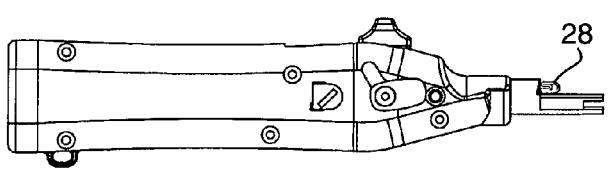
FIG. 13 is a right side view of the fishing line knotter showing the hook in the forward position.
Figure 14:
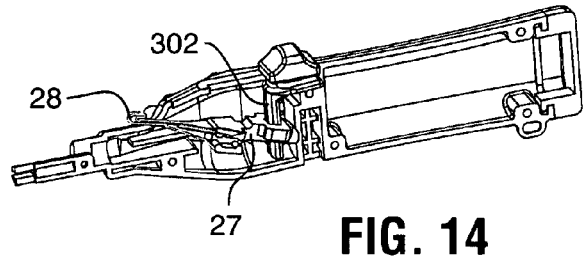
FIG. 14 is a perspective sectional view of the right half of the fishing line knotter showing the hook partially withdrawn within the body tilted at a downward angle.
Figure 15:
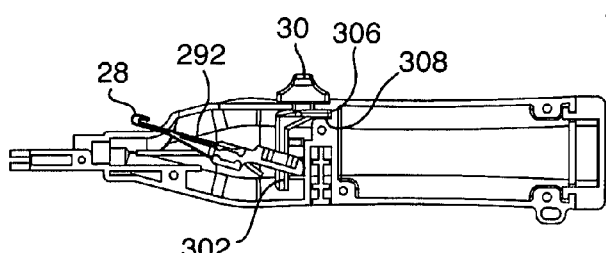
FIG. 15 is a side sectional view of the right half of the fishing line knotter showing the hook partially withdrawn within the body tilted at a downward angle.
Figure 16:
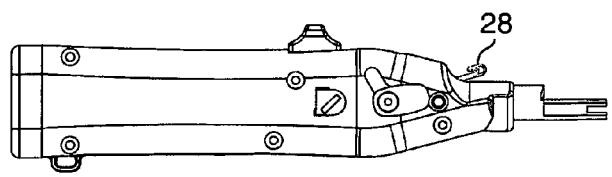
FIG. 16 is a right side view of the fishing line knotter showing the hook in the extended forward position tilted upward at an angle.
Figure 17:
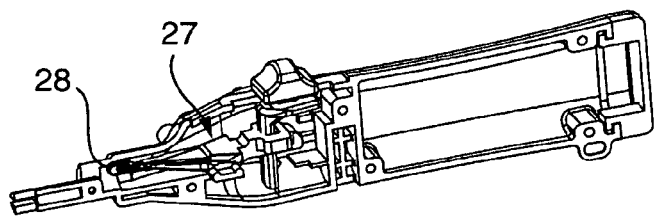
FIG. 17 is a perspective sectional view of the right half of the fishing line knotter showing the hook withdrawn within the body.
Figure 18:
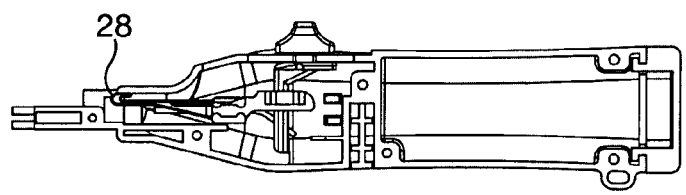
FIG. 18 is a side sectional view of the right half of the fishing line knotter showing the hook withdrawn within the body.
Figure 19:
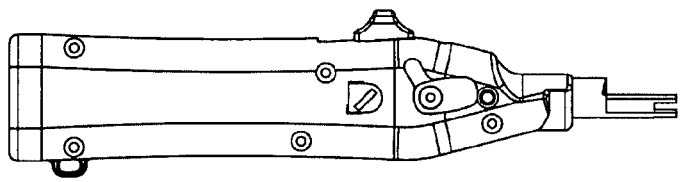
FIG. 19 is a right side view of the fishing line knotter wherein the hook is withdrawn within the body.
Figure 20:
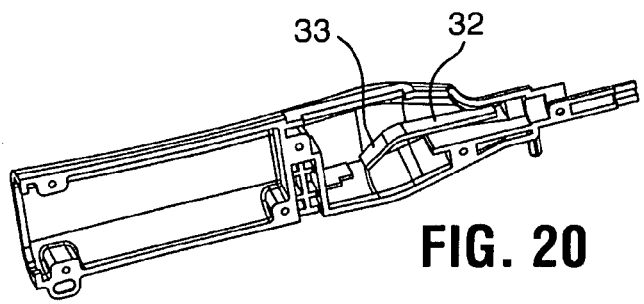
FIG. 20 is a perspective sectional view of the left half of the fishing line knotter showing the guide rail with a declined portion for cooperatively engaging the sliding line puller and hook.
Figure 21:
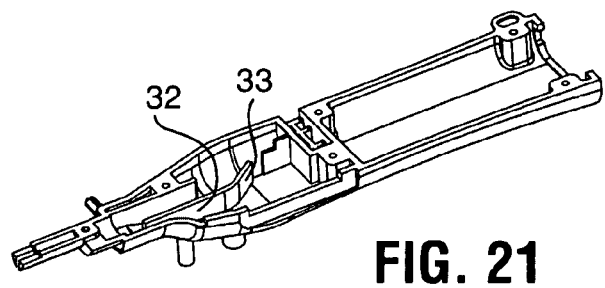
FIG. 21 is a perspective sectional view of the left half of the fishing line knotter showing the guide rail with a declined portion for cooperatively engaging the sliding line puller and hook.

Each half housing 122 and 124 contains half slots 40. When the two halves 122 and 124 are joined, the two half slots 40 together form a slot 41 into which the free end of a clamp stand 70 is inserted, as shown in FIG. 10. The slot 41 is preferably square and sized to firmly receive the square end of clamp shaft 71 so that the knot tool 10 is not able to rotate on the shaft 71. At the other end of the clamp stand shaft 71 is a permanently attached clamp 72 which can be clipped onto any convenient part of a boat, tackle box, tree or the like to allow hands free use of the clamped knot tool 10.

Method of Use

Example 1

The procedure for using the knot tying tool for two handed use by a right or left handed angler is as follows:

Thread the line through the eyelet of the hook with 12-18 inches pulled past the eyelet;

Place the tool in the left hand with the forked end facing distally from the user and the thumb button 30 facing upward;

Place the eyelet of the hook in the fork against the magnet with the hook portion facing distally and the left and right portion of the line extending laterally left and right through the fork 24, (note: the left side receives the short line for right hand operations);

Lock the return line on the right side;

Hold the return line which is connected to the fishing rod against the proximal end of handle to keep this portion of the line out of the way;

Bring the two lines back to the magnet to snag under the molded piece and bring back and under ¼ turn to allow to make the wraps;

With the thumb slide pushed all the way toward the distal end of the tool, wrap the free end around the post 19 from left to right of the line overhand around the second neck 18 of the tool six times;

The post is the pivot point and the line goes through the eyelet and hooks on the vertical post and goes around to secure the line when it starts the wrap;

Hook the free end of the line in hook 28 of the sliding line puller 27;

Slide the thumb button 30 to the proximal rear end of slot 31. At this point the hook 28 will have raised the line up and out of the first neck portion 16;

Release the return line on the right side release post 19;

Pull the free end of the line up out of the first neck portion 16;

While holding the free end of the line and the portion of the line which is connected to the fishing rod, pull the hook and the loops of line free from the tool while keeping the loops around the line but knot around the shank of the hook, and pull the free end of the line away from the eyelet to tighten the knot around the eyelet; and Use the line cut-off tool 52 to cut off the excess line.

Example 2

The knotting procedure described will be for a right handed angler, two handed operation and is described as follows:

1) Place a hook in the left hand, eyelet in the up position;

2) With the line in the right hand, thread the hook eyelet with 12-18 inches pulled past the starting point;

3) Place the device in the left hand with the smaller diameter end pointing away from the anglers body with the flat indentation (immediately in front of the soft foam insert), in the upright position;

4) Place the hook eyelet in the recessed portion of the small end of the device, aligning the double lines in their respective left and right alignment indentations, located on the right and left of center, horizontally;

5) With a rearward snug, place both lines in the selected line retention receptor (dependent on the line weight in question at the moment—Note: Line dimensions are grouped in 2 lb. increments (2 lb. & 4 lb., 6 lb. & 8 lb. and 10 lb. & 12 lb.);

6) The lines may now be released, being held in place by the retention ring;

7) With the short end of the line in hand and all loose line held to the rear, away from the small end of the device, wrap six times, overhand and away from the angler, ending with the tail remainder near the angler and in an upright position;

8) Lower the tail remainder into the desired 45 degree angled receptor for the line size in use. (All wraps are against the shoulder located immediately in front of the retention ring.)

9) Under the line wraps, top center, is located an indented flat surface where the short line end is inserted. After the insertion from the forward end, toward the larger back end, pull the short line snug;

10) Remove the long line from the retention ring. With both lines in hand, slide the line arrangement forward and off the device;

11) Place the barbed end of the hook over the knurled portion of the small end and pull to produce a knot; and 12) Holding the short end line, place the knot behind the cut-off attachment and pull to cut off excess line.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A knot tying tool comprising:
   a longitudinal housing including a proximal handle, a distal forked end, a first neck with a first selected diameter located distally of said handle, a second neck with a smaller second selected diameter, a third neck with a still smaller selected diameter, a sliding line puller which slides longitudinally within a first slot in said first neck and said second neck;
   said first neck having a diameter of about five-eights of an inch, said second neck having a diameter of about one half of an inch, and said third neck having an oval in cross-section and having a minor width of about one quarter of an inch;
   said forked end comprising four tines grouped in two rows of two tines each, said forked ends opening toward a distal end of said knot tying tool, said forked ends having a magnet at a center of the junction of said four tines,
   said knot tying tool having a second longitudinal slot formed in a top surface thereof beginning at a distal end of said proximal handle, said second slot having a thumb button cooperatively and slidably engaged within, said thumb button having a downward extending shaft cooperatively engaging said sliding line puller;

said sliding line puller being horizontally longitudinal and having a hook located at a proximal end thereof, said hook having a free end extending upwardly and then proximally and sized for hooking and pulling a fishing line, said hook having a vertical height just less than a vertical depth of said first slot, said sliding line puller having at least two lateral parallel horizontally spaced apart lugs, said spaced apart lugs having a horizontal channel formed there between, said knot tying tool having a guide rail formed within, said guide rail having a horizontal planar portion which then declines at a proximal end thereof, said horizontal channel cooperatively engaging an edge of said guide rail;

said horizontal channel on said sliding line puller sliding along said guide rail causing said hook to slide within said first slot, said hook extending distally outside of said second neck when said thumb button is pushed to a distal end of said second slot, said hook raising out of said first slot at a proximal end of said first slot when said thumb button is pulled to a proximal end of said second slot, due to said channel following said decline of said guide rail.

2. The knot tying tool defined in claim 1 wherein said proximal handle of said knot tying tool has a cavity formed therein and a closable cap removably attached at an opening of said cavity.

3. The knot tying tool defined in claim 1 wherein said knot tool has a fishing line cutter comprising a flat metallic element with an integral tab extending outward at an angle therefrom.

4. The knot tying tool defined in claim 1 further including a square aperture formed in the bottom surface thereof, said square aperture having a depth of about one inch for the purpose of removably connecting said knot tying tool to a clamp able tool holder.

* * * * *